United States Patent
Shimada

(10) Patent No.: US 12,115,848 B2
(45) Date of Patent: Oct. 15, 2024

(54) MOUNTING STRUCTURE FOR POWER STORAGE DEVICE

(71) Applicant: TOYOTA JIDOSHA KABUSHIKI KAISHA, Toyota (JP)

(72) Inventor: Masaki Shimada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/325,425

(22) Filed: May 30, 2023

(65) Prior Publication Data
US 2023/0294501 A1    Sep. 21, 2023

Related U.S. Application Data

(63) Continuation of application No. 17/138,100, filed on Dec. 30, 2020, now Pat. No. 11,697,336.

(30) Foreign Application Priority Data

Jan. 20, 2020  (JP) .............................. 2020-006576

(51) Int. Cl.
*B60K 1/04*    (2019.01)

(52) U.S. Cl.
CPC ........ *B60K 1/04* (2013.01); *B60K 2001/0438* (2013.01)

(58) Field of Classification Search
CPC .................... B60K 1/04; B60K 2001/0433
See application file for complete search history.

(56) References Cited

U.S. PATENT DOCUMENTS

| | | | | |
|---|---|---|---|---|
| 7,051,825 B2* | 5/2006 | Masui | ..................... | B60L 50/16 280/783 |
| 8,936,126 B2* | 1/2015 | Nitawaki | ............. | B62D 25/087 180/68.5 |
| 9,227,582 B2* | 1/2016 | Katayama | ............... | B60R 16/04 |

(Continued)

FOREIGN PATENT DOCUMENTS

| CN | 105914314 A | 8/2016 |
|---|---|---|
| CN | 108058745 A | 5/2018 |

(Continued)

OTHER PUBLICATIONS

Non-Final Office Action issued in U.S. Appl. No. 17/138,100, dated Dec. 5, 2022.

(Continued)

*Primary Examiner* — Katy M Ebner
(74) *Attorney, Agent, or Firm* — Sughrue Mion, PLLC

(57) ABSTRACT

A mounting structure for a power storage device includes: a power storage device including a power storage stack and a housing case; a floor member; and a rear bracket. The housing case includes a lower case having a rear wall, and an upper case. The floor member is provided with an attachment portion for attaching the rear bracket. The rear bracket includes a front end portion and a rear end portion that is attached to the attachment portion. The power storage stack is disposed inside the housing case to provide a gap between the power storage stack and the rear wall. The front end portion of the rear bracket is fixed to the rear wall to be located between an upper surface and a lower surface of the power storage stack in an up-down direction.

6 Claims, 2 Drawing Sheets

(56) References Cited

U.S. PATENT DOCUMENTS

| | | | |
|---|---|---|---|
| 9,259,998 B1* | 2/2016 | Leanza | B62D 25/20 |
| 9,837,645 B2* | 12/2017 | Katayama | B60R 16/0215 |
| 10,486,515 B2* | 11/2019 | Saeki | B62D 25/20 |
| 11,148,728 B2* | 10/2021 | Saeki | B60K 1/04 |
| 2006/0237248 A1* | 10/2006 | Hayashi | B60R 16/04 |
| | | | 180/68.5 |
| 2008/0196957 A1* | 8/2008 | Koike | H01M 10/6566 |
| | | | 180/68.5 |
| 2011/0284299 A1* | 11/2011 | Takahashi | B60L 50/66 |
| | | | 180/65.21 |
| 2011/0300427 A1* | 12/2011 | Iwasa | B60K 1/04 |
| | | | 429/158 |
| 2014/0008137 A1* | 1/2014 | Shiromura | B62D 25/087 |
| | | | 903/952 |
| 2014/0338999 A1* | 11/2014 | Fujii | B60L 58/26 |
| | | | 180/68.5 |
| 2016/0248059 A1* | 8/2016 | Katayama | B60K 1/04 |
| 2017/0136863 A1 | 5/2017 | Baccouche et al. | |
| 2018/0050606 A1* | 2/2018 | Sugitate | B62D 25/20 |
| 2018/0126835 A1* | 5/2018 | Saeki | B60N 2/005 |
| 2020/0207423 A1* | 7/2020 | Saeki | B62D 25/20 |
| 2021/0221212 A1 | 7/2021 | Shimada | |
| 2022/0314775 A1* | 10/2022 | Mukumoto | B62D 25/20 |
| 2022/0320630 A1* | 10/2022 | Kono | B60K 11/06 |
| 2022/0363121 A1* | 11/2022 | Tanizawa | B60L 50/66 |

FOREIGN PATENT DOCUMENTS

| | | |
|---|---|---|
| JP | 5-201354 A | 8/1993 |
| JP | 2013-032066 A | 2/2013 |
| JP | 5733089 B2 | 6/2015 |
| JP | 2018-75878 A | 5/2018 |
| JP | 2020-128138 A | 8/2020 |
| WO | 2020/170578 A1 | 8/2020 |

OTHER PUBLICATIONS

Notice of Allowance issued in U.S. Appl. No. 17/138,100 dated Mar. 1, 2023.

* cited by examiner

MOUNTING STRUCTURE FOR POWER STORAGE DEVICE

This is a continuation of U.S. application Ser. No. 17/138,100 filed Dec. 30, 2020, which claims priority based on Japanese Patent Application No. 2020-006576 filed on Jan. 20, 2020, the disclosure of which is incorporated herein by reference in its entirety.

BACKGROUND

Field

The present disclosure relates to a mounting structure for a power storage device in a vehicle.

Description of the Background Art

Vehicles such as an electric vehicle and a hybrid vehicle are equipped with a power storage device for supplying electric power to a motor. The power storage device includes a housing case in which a power storage stack is housed. The power storage device is fixed to a floor panel, for example.

As a conventional mounting structure for a power storage device, Japanese Patent No. 5733089 discloses a technique by which a bracket is used to fix the front side of a housing case to a cross member of a vehicle and a reinforce (a reinforcement member) is used to fix the rear side of the housing case to a base mount portion provided on a floor panel.

In the mounting structure for a power storage device disclosed in Japanese Patent No. 5733089, a power storage device is mounted above the floor panel. The reinforce is fixed to the lower surface of the housing case, and inclined downward toward the rear side. Furthermore, inside the housing case, a power storage stack is fastened with a bolt to a bottom portion of the housing case.

SUMMARY

The mounting structure for a power storage device disclosed in Japanese Patent No. 5733089, however, may cause the following situation. Specifically, when a vehicle is collided from behind, an impact transmitted from the floor panel through the reinforce and received by the bottom portion of the housing case may be transmitted to the power storage stack fixed to the bottom portion. Thus, in order to protect the power storage stack from damage or the like caused by an impact transmitted to the power storage stack, countermeasures may need to be taken, for example, by increasing the strengths of parts of the reinforce and the floor panel, a bracket coupling the floor panel and the housing case, and the housing case itself. Thus, the cost for the mounting structure for a power storage device tends to be relatively high.

The present disclosure has been made in consideration of the above-described problems. An object of the present disclosure is to provide a mounting structure for a power storage device, which can more inexpensively suppress transmission of an impact to a power storage stack in a housing case when a vehicle is collided from behind.

A mounting structure for a power storage device according to the present disclosure includes: a power storage device including a power storage stack having an upper surface and a lower surface, and a housing case in which the power storage stack is housed; a floor member formed as a floor of a vehicle, the power storage device being fixed to the floor member; and a rear bracket for fixing a rear portion of the power storage device to the floor member. The housing case includes: a lower case having a rear wall that faces rearward, a side of the lower surface of the power storage stack being fixed to the lower case; and an upper case fixed to the lower case to cover a side of the upper surface of the power storage stack. The floor member is provided with an attachment portion for attaching the rear bracket on a rear side of the rear wall. The rear bracket includes a front end portion fixed to the rear wall, and a rear end portion attached to the attachment portion. The power storage stack is disposed inside the housing case to provide a gap between the power storage stack and the rear wall. The front end portion of the rear bracket is fixed to the rear wall to be located between the upper surface and the lower surface of the power storage stack in an up-down direction.

According to the above-described configuration, when a vehicle is collided from behind, an impact received by the floor panel is transmitted through the rear bracket attached to the attachment portion of the floor panel, and then, received by the rear wall of the lower case. In this case, the front end portion of the rear bracket is fixed to the rear wall of the lower case to be located between the upper surface and the lower surface of the power storage stack in the up-down direction. Thus, when an impact is received by the rear wall of the lower case, the rear wall is deformed to pivot around the base portion of the rear wall toward the inside of the housing case. Inside the housing case, the power storage stack is disposed to provide a gap between the power storage stack and the rear wall of the lower case. Thereby, interference of the deformed rear wall with the power storage stack can be suppressed. This can consequently suppress transmission of an impact to the power storage stack when a vehicle is collided from behind.

Furthermore, by the above-described configuration, transmission of an impact to the power storage stack can be suppressed without increasing the rigidity of the lower case itself or the body itself. Thereby, the manufacturing cost can also be reduced.

In the above-described mounting structure for a power storage device according to the present disclosure, the rear wall has an upper end at a position lower than the upper surface of the power storage stack in the up-down direction. In this case, the front end portion of the rear bracket is fixed to the rear wall at a position lower than the upper end of the rear wall.

According to the above-described configuration, as compared with the case where the upper end of the rear wall is located at a position higher than the upper surface of the power storage stack, it becomes possible to reduce the distance in which the upper end side of the rear wall moves when the rear wall of the lower case is deformed by a rear collision to pivot around the base portion of the rear wall toward the inside of the housing case. As a result, interference of the deformed rear wall with the power storage stack can be further suppressed.

In the above-described mounting structure for a power storage device according to the present disclosure, the power storage stack has a rear surface that faces rearward. In this case, the rear surface of the power storage stack may be provided with a terminal portion that protrudes rearward. Further in this case, the upper end of the rear wall is located at a position lower than the terminal portion.

According to the above-described configuration, it becomes possible to suppress interference of the rear wall of the lower case, which is deformed by a rear collision, with the terminal portion provided on the rear surface of the power storage stack. Thereby, transmission of an impact to the terminal portion by a rear collision can be suppressed.

In the above-described mounting structure for a power storage device according to the present disclosure, the upper case includes a wall that has a lower end portion located at a position lower than the terminal portion and that faces the rear surface from a rear side. In this case, on a rear side of the terminal portion, the wall has a bulging portion that bulges more rearward than the lower end portion.

As the rear wall of the lower case is deformed by a rear collision, the upper case fixed to the lower case is also deformed toward the inside of the housing case. As in the above-described configuration, on the rear side of the terminal portion, the upper case has a bulging portion that bulges rearward. Thereby, interference of the deformed upper case with the terminal portion can be suppressed. Thus, transmission of the impact to the terminal portion by a rear collision can be further suppressed.

In the above-described mounting structure for a power storage device according to the present disclosure, the front end portion of the rear bracket is welded to the rear wall.

According to the above-described configuration, the rear bracket can be fixed stably at a prescribed position as compared with the case where the rear bracket is fastened to the rear wall with a fastening member or the like. Thus, the power storage device can be mounted in a vehicle with accuracy.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
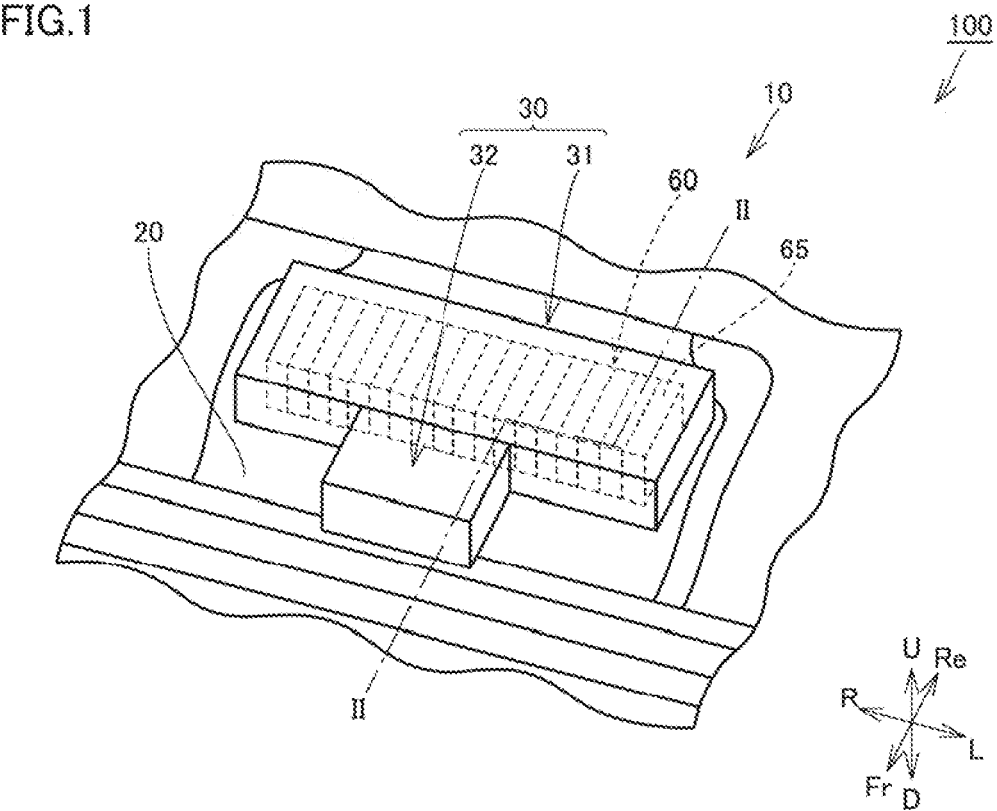
FIG. 1 is a perspective view showing a part of a vehicle having a mounting structure for a power storage device according to an embodiment.

In the following, an embodiment of the present disclosure will be described in detail with reference to the accompanying drawings. In the embodiments described below, the same or corresponding components will be denoted by the same reference characters, and description thereof will not be repeated.

In the figures, the direction of an arrow U indicates an upward direction while the direction of an arrow D indicates a downward direction. Also, the direction of an arrow Fr indicates a direction forward of a vehicle while the direction of an arrow Re indicates a direction rearward of the vehicle. Also, the direction of an arrow L indicates a direction leftward of the vehicle while the direction of an arrow R indicates a direction rightward of the vehicle.

Figure 2:
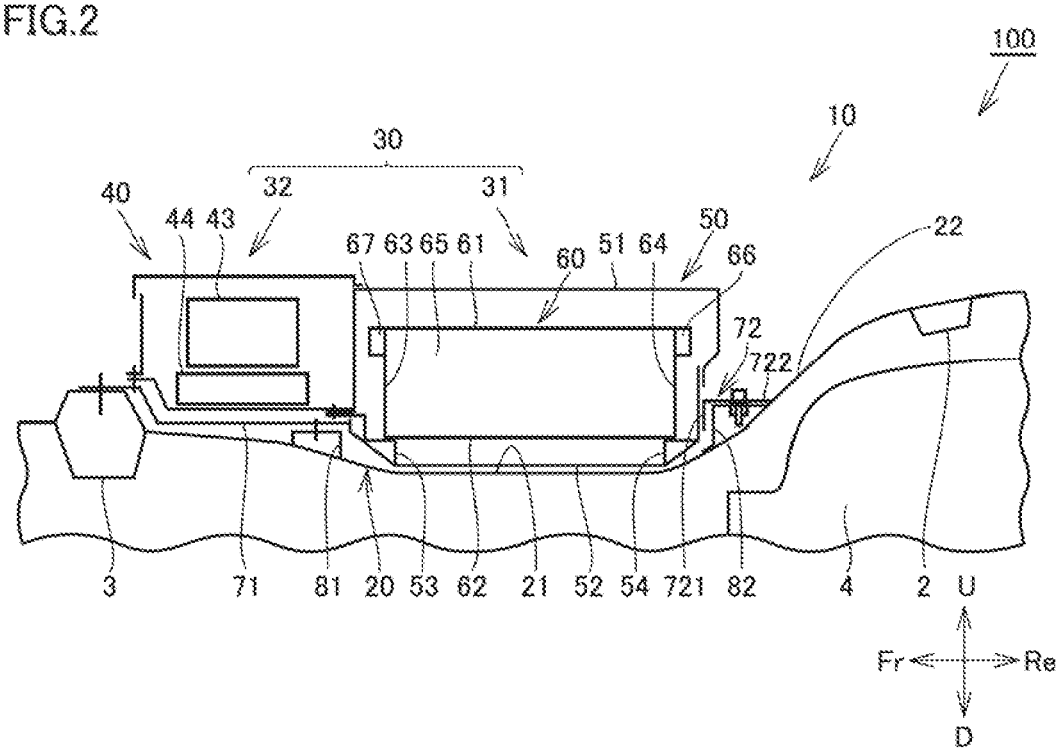
FIG. 2 is a partial cross-sectional view of the vehicle, which is taken along a line II-II shown in FIG. 1.

FIG. 1 is a perspective view showing a part of the vehicle having a mounting structure for a power storage device according to an embodiment. FIG. 2 is a partial cross-sectional view of the vehicle, which is taken along a line II-II shown in FIG. 1. Referring to FIGS. 1 and 2, a vehicle 100 having a mounting structure 10 for a power storage device according to an embodiment will be hereinafter described.

As shown in FIGS. 1 and 2, vehicle 100 according to an embodiment includes mounting structure 10 for a power storage device. Mounting structure 10 for a power storage device is configured to fix a power storage device 30 to vehicle 100. Mounting structure 10 for a power storage device is applicable to a hybrid vehicle provided with an engine and a motor generator (each of which is not shown) as a power source. Furthermore, mounting structure 10 for a power storage device is also applicable to an electric vehicle not including an engine (an internal combustion engine).

As shown in FIG. 1, vehicle 100 to which mounting structure 10 for a power storage device is applied includes a rear cross member 2, a front-side cross member 3, a rear motor 4, a floor member (a floor panel) 20, a power storage device 30, a front bracket 71, and a rear bracket 72.

Mounting structure 10 for a power storage device is mainly formed of floor member 20, power storage device 30, and rear bracket 72, as mentioned above.

Rear cross member 2 and front-side cross member 3 are disposed in parallel in the front-rear direction of vehicle 100. Rear cross member 2 and front-side cross member 3 extend in the width direction of the vehicle. Rear cross member 2 and front-side cross member 3 are joined to floor member (floor panel) 20.

Rear cross member 2 is disposed above rear motor 4. Rear cross member 2 is disposed at a position higher than front-side cross member 3. Rear cross member 2 is disposed rearward of front-side cross member 3.

Floor member 20 forms a floor of vehicle 100. Floor member 20 includes a flat portion 21 and a curved portion 22. Flat portion 21 is formed to be approximately flat and extends rearward from front-side cross member 3. Curved portion 22 extends from the rear side of flat portion 21 so as to curve upward toward rear cross member 2.

Power storage device 30 is disposed above floor member 20 and forward of curved portion 22. Power storage device 30 includes a first unit 31 and a second unit 32.

First unit 31 mainly includes a first case portion 50 as a housing case, and a power storage stack 60.

Power storage stack 60 is housed inside first case portion 50. Power storage stack 60 has: an upper surface 61 and a lower surface 62 that face each other in the up-down direction; and a front surface 63 and a rear surface 64 that face each other in the front-rear direction. Front surface 63 faces forward in the front-rear direction of the vehicle while rear surface 64 faces rearward in the front-rear direction of the vehicle. Power storage stack 60 includes a plurality of power storage cells 65.

The plurality of power storage cells 65 are disposed in parallel in the width direction of the vehicle. The plurality of power storage cells 65 are connected in series, for example. Specifically, each of the plurality of power storage cells 65 has a first terminal portion 66 protruding rearward and a second terminal portion 67 protruding forward. First terminal portion 66 is a positive electrode terminal or a negative electrode terminal. Second terminal portion 67 is a negative electrode terminal or a positive electrode terminal so as to be different in polarity from first terminal portion 66.

A plurality of first terminal portions 66 are disposed on the rear surface 64 side of power storage stack 60 such that their positive electrode terminals and negative electrode terminals are alternately arranged in the width direction of the vehicle. A plurality of second terminal portions 67 are disposed on the front surface 63 side of power storage stack 60 such that their positive electrode terminals and negative electrode terminals are alternately arranged in the width direction of the vehicle.

The plurality of first terminal portions 66 are electrically connected through a first bus bar (not shown). Specifically, the positive electrode terminal of one power storage cell 65 of two power storage cells 65 adjacent to each other is connected by a bus bar to the negative electrode terminal of the other power storage cell 65 of these two power storage cells 65.

The plurality of second terminal portions 67 are electrically connected through a second bus bar (not shown). Specifically, the positive electrode terminal of one power storage cell 65 of two power storage cells 65 adjacent to each other is connected by a bus bar to the negative electrode terminal of the other power storage cell 65 of these two power storage cells 65.

Power storage cells 65 adjacent to each other are connected alternately by the first bus bar on the rear surface 64 side of power storage stack 60 and by the second bus bar on the front surface 63 side of power storage stack 60, so that the plurality of power storage cells 65 are connected in series.

The plurality of first terminal portions 66 correspond to the respective terminal portions provided on rear surface 64 of power storage stack 60.

Power storage cell 65 is a secondary battery such as a nickel-metal hydride battery or a lithium-ion battery, for example. Power storage cell 65 has a rectangular shape, for example. It should be noted that power storage cell 65 is not limited to a rectangular shape but may be a cylindrical shape. Power storage cell 65 may be made of a liquid electrolyte or may be made of a solid electrolyte. Also, power storage cell 65 is not limited to a secondary battery but may be a capacitor that can store electric power, and the like.

First case portion 50 includes an upper case 51 and a lower case 52. Lower case 52 has a substantially box shape that opens upward. The lower surface 62 side of power storage stack 60 is fixed to lower case 52.

Inside lower case 52, a first mounting portion 53 and a second mounting portion 54 are provided, on which power storage stack 60 is to be mounted. First mounting portion 53 and second mounting portion 54 are disposed inside lower case 52 to provide a gap between first mounting portion 53 and second mounting portion 54 in the front-rear direction of the vehicle. Lower surface 62 of power storage stack 60 has both ends in the front-rear direction of the vehicle. Each of both ends is fixed to a corresponding one of first mounting portion 53 and second mounting portion 54. Power storage stack 60 is disposed to provide a gap between power storage stack 60 and a rear wall 52*b* (see FIG. 3) of lower case 52.

Upper case 51 has a substantially box shape that opens downward. Upper case 51 is provided to cover the upper surface 61 side of power storage stack 60. Upper case 51 is fixed to lower case 52.

Second unit 32 mainly includes a second case portion 40, a junction box 43, and a monitoring unit 44. Junction box 43 and monitoring unit 44 are housed in second case portion 40.

Each of junction box 43 and monitoring unit 44 is electrically connected to power storage stack 60. Junction box 43 serves as a connector of wires connecting to power storage stack 60 and to a motor generator and the like through a converter (not shown) and an inverter (not shown).

Monitoring unit 44 monitors the state of each of power storage cells 65 in power storage stack 60.

Front bracket 71 serves to fix the front side of power storage device 30 to floor member 20. Front bracket 71 is disposed to extend in the front-rear direction of the vehicle. The front end side of front bracket 71 is fastened to front-side cross member 3. On the rear side of front-side cross member 3 and on the front side of lower case 52, front bracket 71 is fastened to an attachment portion 81 provided on floor member 20.

Front bracket 71 is fixed on the front side of lower case 52. Specifically, it is preferable that the rear end side of front bracket 71 is welded onto the front end side of lower case 52. Thereby, front bracket 71 can be stably fixed at a prescribed position. Accordingly, variations in position of attachment to floor member 20 can be suppressed, and thus, front bracket 71 can be reduced in size.

Rear bracket 72 serves to fix the rear portion of power storage device 30 to floor member 20. Rear bracket 72 is disposed on the rear side of lower case 52 to extend rearward.

Rear bracket 72 includes a front end portion 721 and a rear end portion 722. Front end portion 721 is disposed to extend in the up-down direction. Rear end portion 722 is disposed to extend rearward from the upper end portion of front end portion 721. On the rear side of lower case 52, rear end portion 722 is attached to an attachment portion 82 provided on floor member 20.

Rear bracket 72 is fixed to rear wall 52*b* (see FIG. 3) of lower case 52. Rear wall 52*b* is provided to face rearward of vehicle 100. Specifically, front end portion 721 of rear bracket 72 is fixed to rear wall 52*b* to be located between upper surface 61 and lower surface 62 of power storage stack 60 in the up-down direction.

Also, it is preferable that front end portion 721 of rear bracket 72 is welded onto rear wall 52*b*. Thereby, rear bracket 72 can be stably fixed at a prescribed position. Accordingly, variations in position of attachment to floor member 20 can be suppressed, and thus, rear bracket 72 can be reduced in size.

Figure 3:
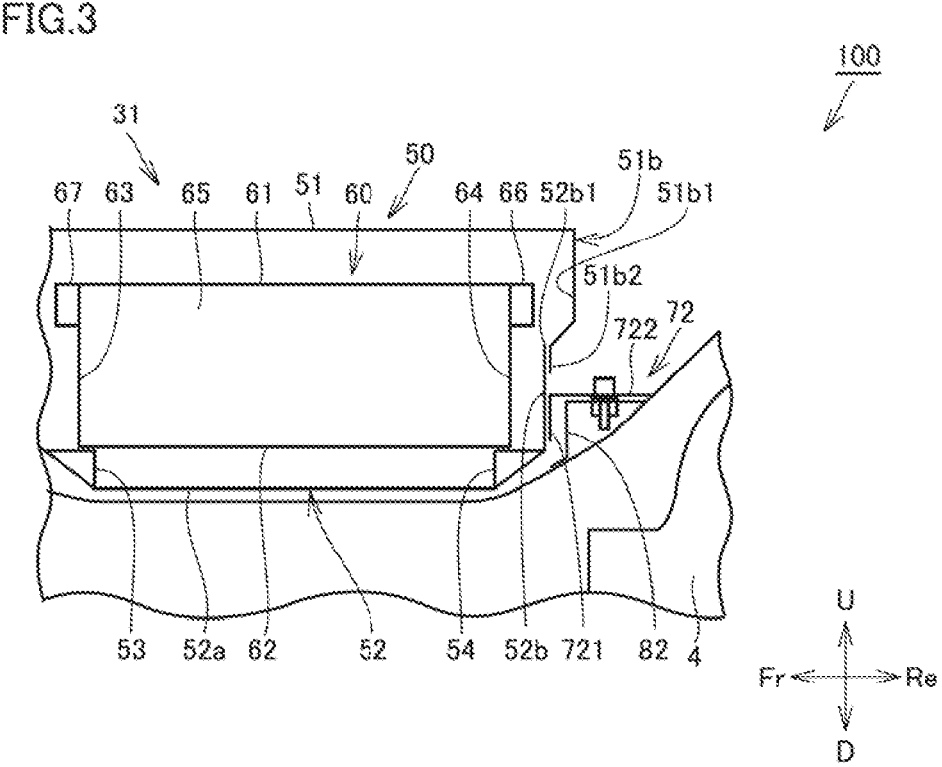
FIG. 3 is an enlarged view of a structure at and around a power storage stack in FIG. 2.

FIG. 3 is an enlarged view of a structure at and around the power storage stack in FIG. 2. Referring to the above-mentioned FIG. 2 and FIG. 3, the structure at and around power storage stack 60 will then be described.

Upper case 51 provided so as to cover the upper side of power storage stack 60 has a wall 51*b* that faces, from the rear side, the upper portion of rear surface 64 of power storage stack 60. Wall 51*b* has a lower end portion 51*b*2 at a position lower than the terminal portion (the above-mentioned first terminal portion 66) provided on rear surface 64 of power storage stack 60. Lower end portion 51*b*2 is fixed to rear wall 52*b* of lower case 52, for example.

On the rear side of the above-mentioned terminal portion (the above-mentioned first terminal portion 66), wall 51*b* has a bulging portion 51*b*1 that bulges more rearward than lower end portion 51*b*2. In other words, in the front-rear direction of the vehicle, the distance from rear surface 64 of power storage stack 60 to bulging portion 51*b*1 is longer than the distance from rear surface 64 to lower end portion 51*b*2.

Furthermore, rear wall 52*b* of lower case 52 has an upper end 52*b*1 located at a position lower than upper surface 61 of power storage stack 60 in the up-down direction. Upper end 52*b*1 is located at a position lower than the terminal portion (the above-mentioned first terminal portion 66) provided on rear surface 64 of power storage stack 60.

Front end portion 721 of rear bracket 72 is fixed to rear wall 52b at a position lower than upper end 52b1 of rear wall 52b.

Figure 4:
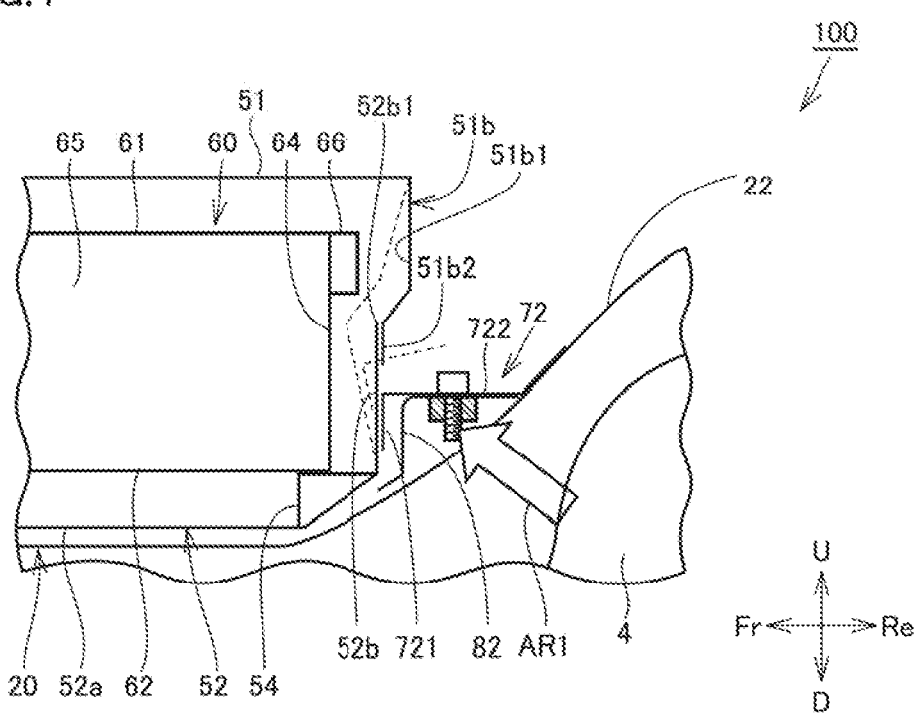
FIG. 4 is a diagram showing the state where a rear side of a housing case is deformed when the vehicle having the mounting structure for a power storage device according to the embodiment is collided from behind.

FIG. 4 is a diagram showing the state where the rear side of the housing case is deformed when the vehicle having the mounting structure for a power storage device according to the embodiment is collided from behind. Referring to FIG. 4, an explanation will be hereinafter given with regard to the state where the rear side of the housing case is deformed when vehicle 100 is collided from behind.

As shown in FIG. 4, when vehicle 100 is collided from behind, rear motor 4 moves forward to push curved portion 22 of floor member 20. Thereby, an impact as indicated by an arrow AR1 is received by rear bracket 72 and transmitted through this rear bracket 72 to rear wall 52b.

In this case, front end portion 721 of rear bracket 72 is fixed to rear wall 52b of lower case 52 so as to be located between upper surface 61 and lower surface 62 of the power storage stack in the up-down direction. Thus, when rear wall 52b of lower case 52 receives an impact, rear wall 52b is deformed to pivot around the base portion of rear wall 52b toward the inside of first case portion (housing case) 50, as indicated by a dashed line in FIG. 4. Inside first case portion 50, power storage stack 60 is disposed to provide a gap between power storage stack 60 and rear wall 52b of lower case 52. Thus, interference of the deformed rear wall 52b with power storage stack 60 can be suppressed. As a result, when vehicle 100 is collided from behind, transmission of an impact to power storage stack 60 can be suppressed.

Furthermore, transmission of an impact to power storage stack 60 can be suppressed without increasing the rigidity of the lower case itself or the body itself. Thereby, the manufacturing cost can also be reduced.

Furthermore, upper end 52b1 of rear wall 52b is located at a position lower than upper surface 61 of power storage stack 60, and front end portion 721 of rear bracket 72 is fixed to rear wall 52b at a position lower than upper end 52b1 of rear wall 52b.

Thus, when rear wall 52b is deformed as described above due to a rear collision, the moving distance of upper end 52b1 of rear wall 52b can be reduced as compared with the case where upper end 52b1 of rear wall 52b is located at a position higher than upper surface 61 of power storage stack 60. As a result, interference of the deformed rear wall 52b with power storage stack 60 can be further suppressed.

In addition, upper end 52b1 of rear wall 52b is located at a position lower than the terminal portion (the above-mentioned first terminal portion 66) provided on rear surface 64 of power storage stack 60. Thus, it becomes possible to suppress interference of rear wall 52b of the lower case, which is deformed by a rear collision, with the terminal portion (first terminal portion 66) provided on rear surface 64 of power storage stack 60. Thereby, transmission of an impact to the terminal portion (first terminal portion 66) by a rear collision can be suppressed.

Furthermore, on the rear side of the above-mentioned terminal portion (first terminal portion 66), wall 51b of upper case 51 is provided with bulging portion 51b1 that bulges more rearward than lower end portion 51b2 of wall 51b.

When rear wall 52b of lower case 52 is deformed as described above due to a rear collision, upper case 51 (specifically, wall 51b of upper case 51) fixed to lower case 52 is also deformed toward the inside of first case portion 50, as indicated by the dashed line in FIG. 4. Also in such a case, bulging portions 51b1 provided as described above can suppress interference of the deformed upper case 51 with the above-mentioned terminal portion.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A mounting structure for a power storage device, the mounting structure comprising:
a power storage device including
a power storage stack having an upper surface and a lower surface, and
a housing case in which the power storage stack is housed;
a floor member formed as a floor of a vehicle, the power storage device being fixed to the floor member; and
a rear bracket for fixing a rear portion of the power storage device to the floor member, wherein
the housing case includes
a lower case having a rear wall that faces rearward, a side of the lower surface of the power storage stack being fixed to the lower case, and
an upper case fixed to the lower case to cover a side of the upper surface of the power storage stack,
the floor member is provided with an attachment portion for attaching the rear bracket on a rear side of the rear wall,
the rear bracket includes
a front end portion fixed to the rear wall, and
a rear end portion attached to the attachment portion and disposed to extend rearward from an upper portion of the front end portion,
the power storage stack is disposed inside the housing case to provide a gap between the power storage stack and the rear wall,
the front end portion of the rear bracket is fixed to the rear wall to be located between the upper surface and the lower surface of the power storage stack in an up-down direction,
the power storage stack has a rear surface that faces rearward,
the upper case includes a wall that has a lower end portion and faces the rear surface from a rear side,
the lower end portion is fixed to the rear wall of the lower case, and
a position where the lower end portion is fixed to the rear wall of the lower case is located above a position where the front end portion of the rear bracket is fixed to the rear wall.

2. The mounting structure for a power storage device according to claim 1, wherein
the rear wall has an upper end at a position lower than the upper surface of the power storage stack in the up-down direction, and
the front end portion of the rear bracket is fixed to the rear wall at a position lower than the upper end of the rear wall.

3. The mounting structure for a power storage device according to claim 2, wherein
the power storage stack has a rear surface that faces rearward,
the rear surface of the power storage stack is provided with a terminal portion that protrudes rearward, and
the upper end of the rear wall is located at a position lower than the terminal portion.

4. The mounting structure for a power storage device according to claim 3, wherein
- the lower end portion is located at a position lower than the terminal portion, and
- on a rear side of the terminal portion, the wall has a bulging portion that bulges more rearward than the lower end portion.

5. The mounting structure for a power storage device according to claim 1, wherein
- the front end portion of the rear bracket is welded to the rear wall.

6. The mounting structure for a power storage device according to claim 1, wherein
- the lower surface is fixed to the lower case at opposing sides of the power storage stack in a front-rear direction such that a center portion of the lower surface does not contact the lower case.

* * * * *